Oct. 12, 1954      L. M. PARKER      2,691,544
ELECTRICAL MEANS FOR ACTUATING LATCHES OF AUTOMOBILE DOORS
Filed Dec. 1, 1951
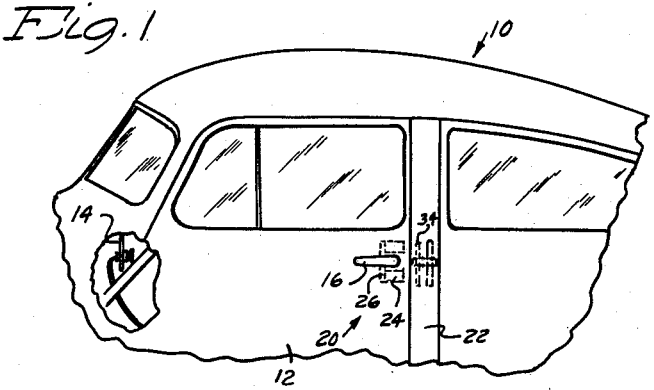
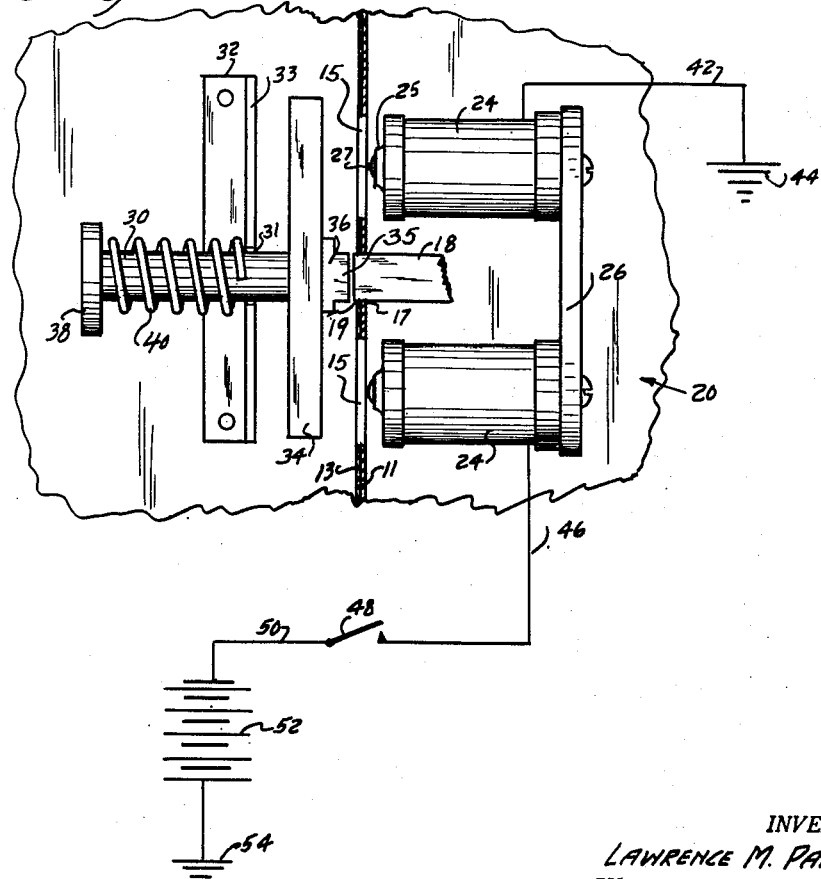
INVENTOR.
LAWRENCE M. PARKER
BY
John L. Woodward
ATTORNEY Patented Oct. 12, 1954

2,691,544

UNITED STATES PATENT OFFICE 2,691,544

ELECTRICAL MEANS FOR ACTUATING LATCHES OF AUTOMOBILE DOORS

Lawrence M. Parker, Minneapolis, Minn.

Application December 1, 1951, Serial No. 259,410

3 Claims. (Cl. 292—254)

This invention relates to an electrical actuating means for moving the latch of an automobile door and other motor vehicles to its unlatched position independently of the actuation of the door knob for the latch.

It is an object of this invention to provide electrically actuated means operably associated with the latch of an automobile door for moving the latch to its retracted position independently of the actuation of the door knob.

It is a further object of this invention to provide electrical means for actuating the latch of an automobile door to its retracted position and the actuating means utilizing the battery of the vehicle at its source of energy.

It is a still further object of this invention to provide means which are energized electrically for actuating the latch of an automobile door to its completely retracted position and which is of simple and practical construction, efficient and reliable in operation, relatively inexpensive to manufacture and install in operative position on the vehicle.

It is a prime purpose of this invention to provide means for automatically actuating the latch of an automobile door to its completely retracted position independently of the actuation of the door knob for the latch. If the door knob for a latch of an automobile door should be so damaged that it would not actuate the latch for the door to its retracted position so that the door could be opened, then the actuating means of this invention could then be actuated for moving the latch of the door to its completely retracted position so that the automobile door could be moved to its open position.

Other objects and advantages reside in the details of construction and the operation of the means in combination with an automobile door and its latch as more fully hereinafter described and claimed, reference being had to the accompanying drawing forming part hereof, wherein like numerals refer to like parts throughout, and in which:

Figure 1 is a fragmentary side elevational view of an automobile showing the independent electrical actuating means for moving the latch for a door of the automobile to its retracted position mounted in the door and a portion of the body of the automobile adjacent the door, with parts broken away and shown in section to show the position of the switch for the actuating means.

Figure 2 is a sectional view through the door and adjacent body of the automobile shown in Figure 1, on an enlarged scale, showing the elements of the actuating means for moving the latch of the door to its retracted position, and also showing schematically the electric circuit for the actuating means.

Referring now more in detail to the characters of reference on the drawing, the numeral 10 denotes an automobile of which 12 is a door thereof, and 14 is the instrument panel. A door knob 16 of conventional construction is connected to a conventional latch 18 in an appropriate manner for operating the latch 18 to its retracted position so that the door 12 of the automobile 10 may be open when a person wishes to enter or leave the automobile 10.

A means 20, for moving the latch 18 to its completely retracted position independently of the operation of the door knob 16, is shown mounted in the inner walls of the automobile body 22 adjacent door 12 and also mounted in the inner structure of door 12.

A pair of electro-magnets 24 are connected and attached to a bar 26 of soft iron thus forming a complete U-magnet. The bar 26 is attached to cores of the magnets 24—24 and to the body of the automobile by appropriate means. The electro-magnets 24—24 and the bar 26 are mounted between the outer and inner walls of the automobile 10 adjacent the door jamb 13. The door jamb 13 is provided with aperture means adjacent the electro-magnets 24—24 for a purpose hereinafter set forth. The magnet cores are indicated at 25 and each of these cores 25 is provided with a non-magnetic stop 27 for a purpose to be set forth hereinafter.

A stem 30 is slidably mounted in an aperture 31 in a plate or guide member 32 secured to a portion of a side-wall of the body 22 of the automobile 10. An armature 34 is mounted on the inner end of stem 30, and a lug 36 of non-magnetic material is positioned on the inner side of the armature 34 intermediate its ends for engaging the latch 18 when the electrical actuating means 20 is energized. A collar 38 is formed on the outer end of stem 30, and a compression spring 40 is carried on the stem 30 between the collar 38 and a flange 33 of plate 32. The compression spring 40 normally urges the stem 30 outwardly, see Figure 2. The wall 11 of door 12 is provided with apertures adjacent the armature 34.

A conductor 42 connects the upper electro-magnet 24 to a suitable ground 44 on the body of automobile 10. A conductor 46 is connected to one terminal of a manual switch 48 mounted on the instrument panel 14 of the automobile 10, and a conductor 50 connects the other terminal of the switch 48 with the battery 52 for the automobile 10. The battery 52 is grounded to the body of the automobile 10 as at 54 for completing the electric circuit for the electro-magnets 24—24.

*Operation*

In operation my improved actuating means for retracting the latch 18 of an automobile door 12 functions as follows:

Assuming that the door 12 of the vehicle 10 is closed with the latch 18 extending through the aligned apertures 17 and 19 in the wall 11 of door 12 and jamb 13 thus holding the door 12 in its closed position. If for any reason the driver of the automobile 10 wishes to move the latch 18 to its retracted position without operating the door knob 16 for latch 18, he closes the switch 48 completing an electric circuit from the battery 52 through the pair of electro-magnets 24—24. The electro-magnets 24—24 will now be energized and attract the armature 34 toward them. The reduced portion 35 on lug 36 carried by the armature 34 engages the end of latch 18 and moves it through the aperture 19 in the jamb 13 to its retracted position. Now the door 12 can be moved to open position by either pushing on the inside of the door 12 or pulling on the door knob 16.

As soon as the switch 48 is opened, the electro-magnets 24—24 are de-energized, and the compression spring 40 on the stem 30 moves the stem 30 outwardly thus returning the armature 34 and its lug 36 to their inoperative position into the side portion of body 22 of the automobile 10.

The apertures 15 in the jamb 13 adjacent the armature 34 and in the wall 11 of door 12 adjacent the magnets 24—24 are provided so that the electro-magnets 24—24 can more easily attract the armature 34.

The non-magnetic stops 27 on the magnets 24—24 and the non-magnetic lug 36 on the armature 34 are to prevent either adherence of the armature 34 to the magnets 24—24 or adherence of the armature 34 to the latch 18 so that the door 12 may be readily pushed open.

Heretofore the door knobs of automobile doors have become broken or disconnected from the latch means for the doors so that it was impossible to quickly and easily open the doors thereof. So as a consequence I have devised the present actuating means for moving a latch of an automobile door to its retracted position so that a jambed door may be easily opened.

In view of the foregoing description taken in conjunction with the accompanying drawing, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

Having thus described the invention, what is claimed as new is:

1. In a lock operating mechanism for automatically moving a latch of a lock to its retracted position comprising plunger means including a plunger provided with a latch engaging end, a lug of non-magnetic material formed on the latch engaging end of the plunger, spring means mounted on the plunger for normally holding the plunger in its inoperative position, an armature carried by the plunger, electro-magnetic means positioned in operative relationship with said plunger and its armature, a source of electric current, wires connecting the source of current with the electro-magnetic means, and means in the wires to complete an electric circuit through said electro-magnetic means so that the electro-magnetic means attracts the armature for actuating the plunger to its operative position whereby the lug on the latch engaging end of the plunger moves the latch of the lock to its retracted position.

2. In a lock operating mechanism for automatically moving a latch of a lock to its retracted position, a guide member, a plunger mounted for movement in the guide member provided with a latch engaging end, a lug of non-magnetic material formed on the latch engaging end of the plunger, a compression spring mounted on the plunger for normally holding the plunger in its inoperative position, an armature carried adjacent the said latch engaging end of the plunger, a pair of electro-magnet means positioned opposite the latch engaging end of the plunger, a source of electric current, wires connecting the source of electric current with the pair of electro-magnet means, and means in the wires to complete an electric circuit through the pair of electro-magnets so that the pair of electro-magnets attracts the armature for moving the lug of non-magnetic material on the latch engaging end of the plunger into engagement with the latch of the lock for moving the latch of the lock to its retracted position.

3. In a lock operating mechanism for automatically moving a latch of a lock to its retracted position, a guide member, a plunger mounted for movement in the guide member, a latch engaging portion provided on one end of the plunger, a compression spring mounted on the plunger for normally holding the plunger in its inoperative position, an armature carried adjacent the said one end of the plunger, a pair of electro-magnet means positioned opposite the latch engaging end of the plunger, a source of electric current, wires connecting the source of electric current with the pair of electro-magnet means, and means in the wires to complete an electric circuit through the pair of electro-magnet means so that the pair of electro-magnets attracts the armature for moving the latch engaging portion of the plunger into engagement with the latch of the lock for moving the latch of the lock to its retracted position.

References Cited in the file of this patent

UNITED STATES PATENTS

| Number | Name | Date |
|---|---|---|
| 656,341 | Carleton | Aug. 21, 1900 |
| 761,290 | Fagan | May 31, 1904 |
| 947,866 | Taylor | Feb. 1, 1910 |
| 1,262,651 | David | Apr. 16, 1918 |
| 2,499,727 | Craig | Mar. 7, 1950 |
| 2,512,776 | Queen | June 27, 1950 |
| 2,525,019 | Doherty | Oct. 10, 1950 |